United States Patent [19]
Barbarian

[11] Patent Number: 5,425,460
[45] Date of Patent: Jun. 20, 1995

[54] ROTATABLE CONTAINER-STORING AND SELECTABLE-CONTAINER HOLDING APPARATUS

[76] Inventor: Joseph Barbarian, 9625 Sepulveda Blvd., #2, Sepulveda, Calif. 91343

[21] Appl. No.: 69,429

[22] Filed: Jun. 1, 1993

[51] Int. Cl.⁶ .............................................. A47B 73/00
[52] U.S. Cl. ..................................... 211/77; 211/129; 211/131; 248/131; 248/139
[58] Field of Search ................. 211/77, 128, 129, 131, 211/133; 248/131, 139, 181, 372.1, 415, 349

[56] References Cited

U.S. PATENT DOCUMENTS

| | | | |
|---|---|---|---|
| 401,829 | 4/1889 | Hall | 248/131 |
| 1,878,302 | 9/1932 | Tourtois | 211/77 |
| 2,281,849 | 5/1942 | McCoppin | 211/77 |
| 2,461,177 | 2/1949 | Prestien | 132/79 |
| 2,748,952 | 6/1956 | Fleit et al. | 211/74 |
| 3,198,408 | 8/1965 | Benner | 223/66 |
| 4,296,766 | 10/1981 | Benis | 132/73 |
| 4,321,935 | 3/1982 | Sussman | 132/73 |
| 4,533,051 | 8/1985 | Fleming | 206/563 |
| 4,892,197 | 1/1990 | Slattery et al. | 211/14 |

*Primary Examiner*—Leslie A. Braun
*Assistant Examiner*—Catherine S. Collins
*Attorney, Agent, or Firm*—Albert O. Cota

[57] ABSTRACT

A rotatable container-storing and selectable container-holder apparatus (10) that is designed to be used by manicurist and hobbyist. The apparatus provides convenient storage for paint and liquid containers (60) and allows a particular container (60) to be placed in a tilted position for easy access. The apparatus consists of a rod (12) that extends upwardly from the upper surface (14A) of a stationary base (14). Over the rod (12), against a lower spacer (16), is inserted a rotatable platform assembly (18) that consists of a lower platform (20) and an upper platform (22) that are separated by a center spacer (24). The upper platform contains a plurality of circular and rectangular openings (22D), (22E) into which may be inserted a container (60). On the upper end (12B) of the rod (12) is attached a container receiving and clamping assembly (30) that may be designed with a structure that provides a single-plane-arc or with an universal joint that allows multiple angular positions to be set. In either designs, the container receiving and clamping assembly (30) allow a selected container (60) to be placed within a container holder (40) that is then maintained in a selected position by a pair of spring biased clamping arms (42).

19 Claims, 3 Drawing Sheets

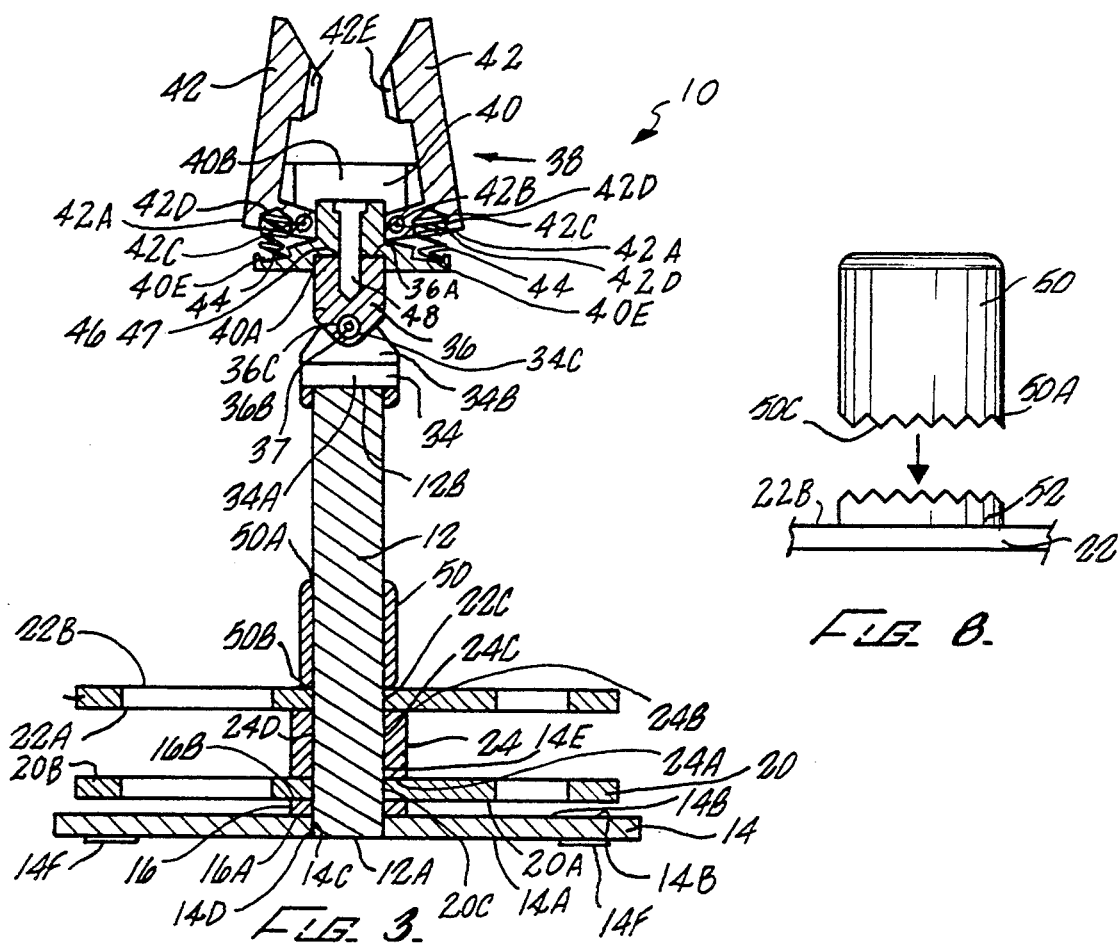
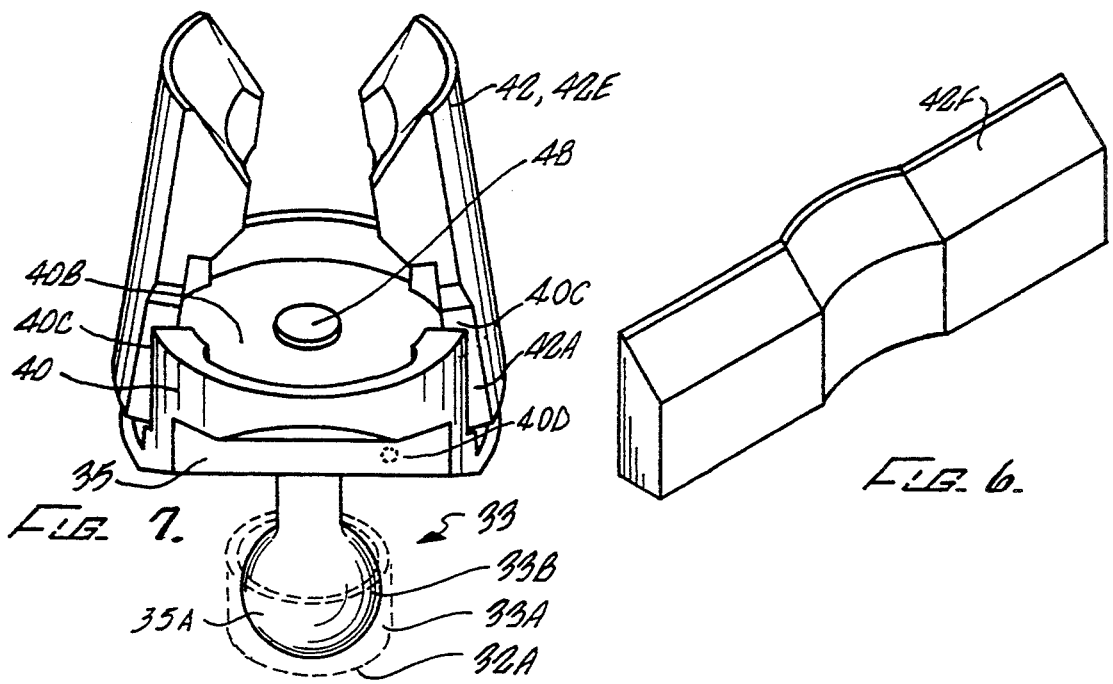

ROTATABLE CONTAINER-STORING AND SELECTABLE-CONTAINER HOLDING APPARATUS

TECHNICAL FIELD

The invention pertains generally to apparatuses that hold several small liquid containers and more particularly to an apparatus having a rotatable platform assembly that stores containers and that includes a pair of clamping jaws that tiltably hold a selected container.

BACKGROUND ART

The use of apparatuses for storing and holding small containers of liquid substances in-place such as finger nail polish and other implements particularly used by manicurist and the like, is disclosed in the prior art. In general, these prior art apparatuses fulfill their design requirements of holding contains and in some designs of providing a device for holding and tilting a selected container. However, when compared to the design of the instant invention, the prior art designs are relatively complex, are not as cost-effective to manufacture and do not provide the ease of use and utility inherent in the instant invention.

To achieve an optimized utility, it is necessary that a container storing and holding apparatus include in combination, a rotatable container-storing base, a means for tiltably holding a single, selected container in an accessible location away from the stored containers and provisions for storing small articles. The instant invention fulfills all of these requirements in an aesthetically, easy to use and convenient apparatus.

A search of the prior did not disclose any patents that read directly on the claims of the instant invention, however the following U.S. patents are considered related:

| PATENT NO. | INVENTOR | ISSUED |
| --- | --- | --- |
| 4,533,051 | Fleming | 6 August 1985 |
| 4,321,935 | Sussman | 30 March 1982 |
| 4,296,766 | Benis | 27 October 1981 |
| 2,461,177 | Prestien | 8 February 1949 |

The No. 4,533,051 Fleming patent discloses a holder that is particularly adapted for holding bottles, jars, brushes and other implements used by manicurists in the construction of artificial nails or in the repair of natural nails. The holder includes a rectangular base having circular openings of various diameters for the placement of bottles and a pair of slots for the placement of shields as are used by manicurist. The holder also includes a handle that projects upwardly from the base.

The No. 4,321,935 Sussman patent discloses a fingernail-polishing structure intended to enable the polishing of fingernails without third party assistance. The structure includes a base having a pivotally mounted fingernail polish bottled holder, a universally movable finger rest or support and a set of openings for holding various implements used by manicurists.

The No. 4,296,766 Benis patent discloses a manicuring case and supporting apparatus for storing manicuring implements. The apparatus has a base having an interior cavity and includes a plurality of apertures in the top surface thereof. Each aperture is adapted to receive a bottle of polish and is configured to preclude the bottle from being inadvertently dislodged. The base also includes an arcuate member having a plurality of concave depressions on its top surface. The concave depressions are sized to provide a base upon which the user's hand can be placed during use of the apparatus.

The No. 2,461,177 Prestien patent discloses a manicuring case having a housing shaped to resemble a butter churn. The housing is provided with two hinged front doors that open to an inner space. This inner space contains a rotatable base member that has a plurality of upwardly extending resilient fingers adapted to engage containers of various sizes. On the inside surface of each door is a strap member formed with a plurality of loops. Each loop receives a manicuring implement such as tweezers, scissors and the like.

DISCLOSURE OF THE INVENTION

The rotatable container-storing and selectable container-holding apparatus is designed to store several small containers of liquid or paint, and to allow a user to place a single, selected container in an angular position for easy access. The apparatus in its basic configuration consists of:

a) an upwardly extending rod having a lower surface and an upper end, b) a stationery base having a lower surface and an upper surface. The upper surface of the base is rigidly attached to the lower surface of the rod by an attachment means, c) a lower spacer having a lower surface, an upper surface and a rod bore therethrough. The spacer is sized to fit over the rod with its lower surface rigidly attached to the upper surface of the base, d) a rotatable platform assembly having at least a lower platform with a lower surface and an upper platform with an upper surface. The upper platform includes a plurality of circular and rectangular openings therethrough that are sized to receive and hold containers and other implements. The lower and upper platforms are separated by and are rigidly attached at their upper and lower surfaces to the respective lower and upper surfaces of a center spacer. Both the platforms and the center spacer have a bore therethrough that is sized to rotatably fit over the rod with the lower surface at the lower platform rotatably placed against the upper surface of the lower spacer, and e) a container receiving and clamping means attached to the upper end of the rod that allows a selected container to be held and angularly positioned. The clamping means may consist of an assembly that allows either a container to be tilted in a single-plane-arc or an assembly that incorporates a universal joint that allows universal container tilting.

Although the apparatus is particularly designed to be used by manicurists for polishing finger nails, the apparatus also finds utility for hobbyists. For example, in model making and painting, containers of model dope or paint of various colors can be stored within the circular and rectangular openings on the upper platform. When a specific container is needed, it is removed from its container opening and placed within the container receiving and clamping means. When so placed, the selected container can be selectively tilted for use. In lieu of placing the paint container in the clamping assembly, the container(s) can remain in their openings and used directly therefrom.

In view of the above disclosure, it is the primary object of the invention to provide an apparatus that is simple in structure, aesthetically designed and that allows several containers to be stored and that allows a selected container to be placed in a tilted position for easy access and use.

In addition to the primary object of the invention it is also and object to provide an assembly that:
- is aesthetic, simple, safe, durable, efficient, versatile and compact,
- is pleasing in appearance,
- is cost effective from both a manufacturer's and consumer's point of view,
- is easy to carry from place to place,
- can readily be set-up with the contents thereof accessible for use, These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 3 is a front elevational sectional view of the apparatus.

FIG. 6 is a perspective view of a horizontally elongated section that is attached to a clamping arm.

FIG. 7 is a perspective view of the second embodiment of the container receiving and clamping means.

FIG. 8 is an elevational view of a combination breaking sleeve having serrations that interface with a serrated disk attached to the upper surface of the lower platform.

BEST MODE FOR CARRYING OUT THE INVENTION

Figure 1:
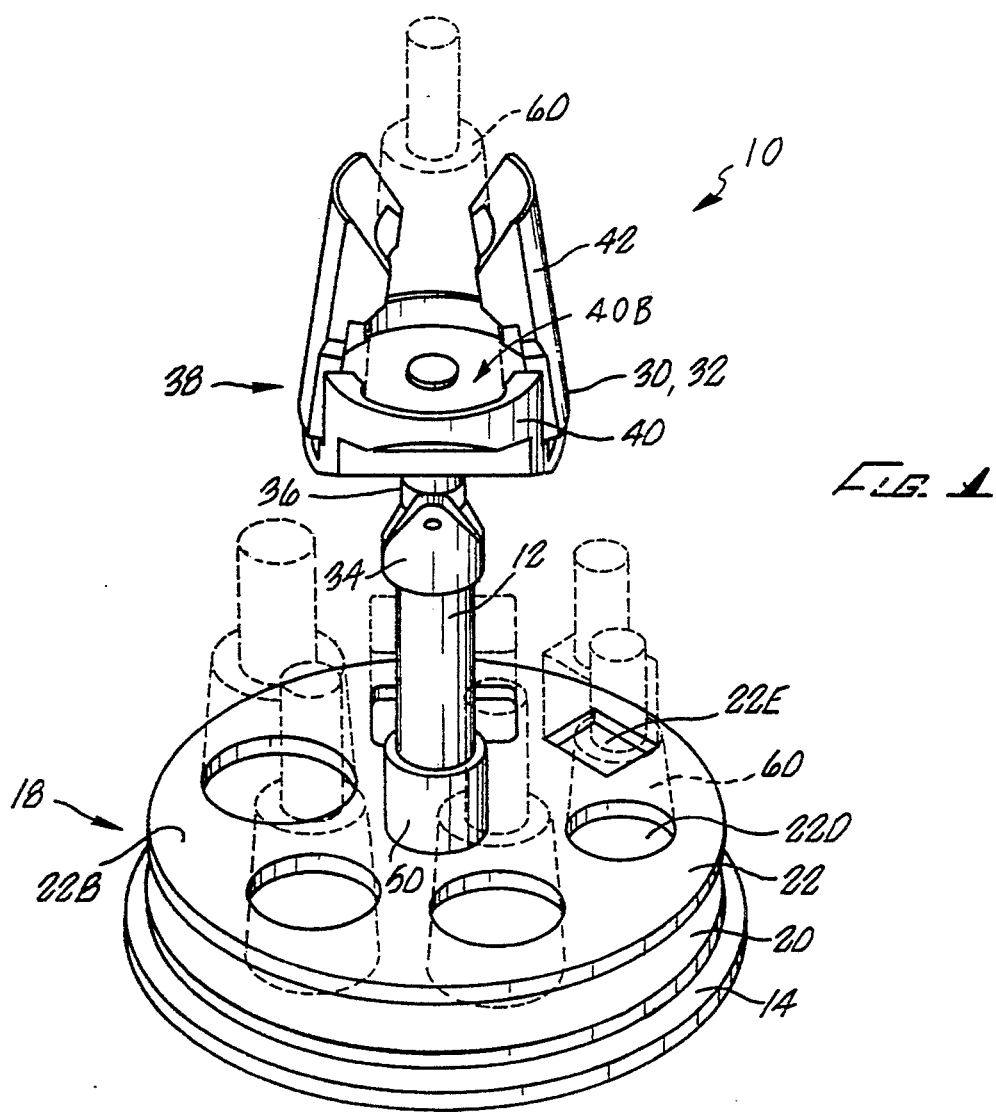
FIG. 1 is a perspective view of the rotatable container-storing and selectable container-holding apparatus.

The best mode for carrying out the invention is presented in terms of a preferred embodiment that is designed to provide an easy to use apparatus that holds a variety of small containers and allows a particular container to be placed in a tilted easy-to-use position. The preferred embodiment of the rotatable container-storing and selectable container-holding apparatus 10 as shown in FIGS. 1-8 is comprised of the following major elements: an upwardly extending rod 12, a stationary base 14, a lower spacer 16, a rotatable platform assembly 18, a container receiving and clamping means 30 that is further disclosed in a preferred and second embodiment, a finger holding stand and an elongated rectangular receptacle. The inventive elements are used in combination with various sizes and shapes of containers 60 and other implements that are particularly used in manicuring.

The upwardly extending rod 12 as best shown in FIGS. 1 and 3, has a lower surface 12A and an upper end 12B. The diameter and particularly the length of the rod can vary. However, in determining these dimensions it was found that a length of 4 inches (10.16 cm) with a diameter of 0.625 inches (1.588 cm) was optimum. The rod as well as all the other elements of the apparatus may be constructed of any rigid material such as a metal or a wood. However, a plastic material and particularly an acrylic clear or tinted plastic was found to be both cost effect and aesthetically pleasing.

Figure 2:
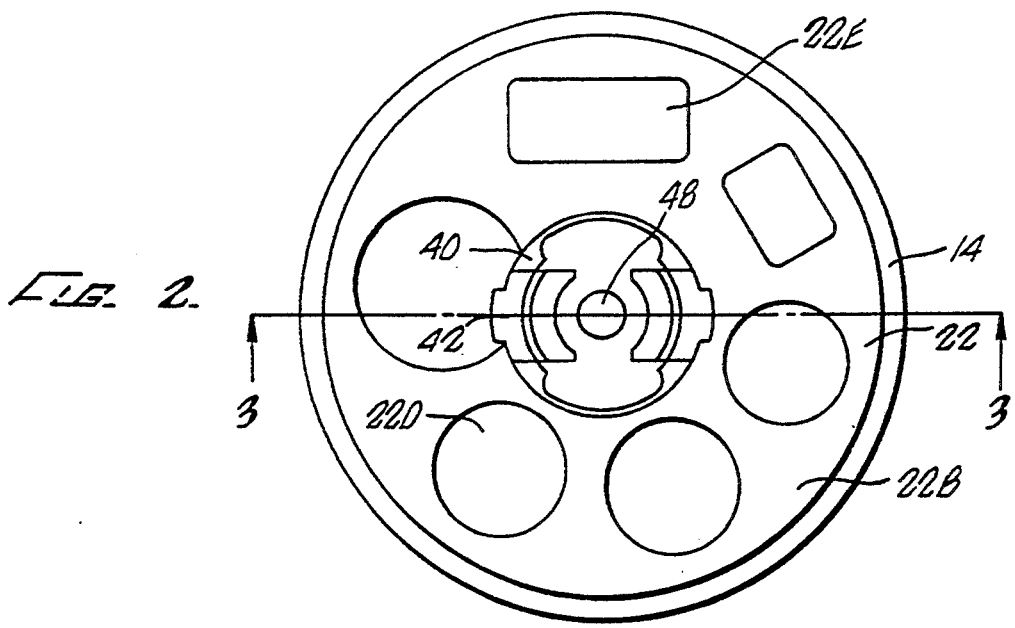
FIG. 2 is a top plan view of the apparatus.

The stationary base 14 as shown best in FIGS. 1, 2 and 3 has a lower surface 14A, an upper surface 14B and preferably has a circular shape with a diameter of 5.25 inches (13.335 cm) and a thickness of 0.25 inches (0.635 cm). The upper surface of the base is rigidly attached to the lower surface of the rod 12 by an attachment means 14C. In the preferred embodiment, this attachment means consists of having a substantially centered rod bore 14D cut therethrough on said base 14.

The bore is sized to allow the lower surface 12A of the rod 12 to be tightly inserted therein with the rod's lower surface flush with the lower surface of the base 14. To further aid in securing the rod to the rod bore, an adhesive 14E may be spread around the rod bore 14D prior to inserting the rod as shown in FIG. 3. To increase the stability of the apparatus, the stationary base has attached, by an adhesive to its lower surface, a grouping of resilient pads 14F as also shown in FIG. 3.

Between the stationary base 14 and the rotatable platform, described next, is a lower spacer 16. This spacer, which has a thickness that is approximately one-half the thickness of the stationary base 14, has a lower surface 16A, an upper surface 16B and a rod bore 16C therethrough. The lower surface 16A is rigidly attached, by an adhesive, to the upper surface of the base 14 with the two respective bores 14D, 16C in concentric alignment. To maintain the aesthetic appearance of the apparatus 10, the spacer preferably has a circular cross section with a diameter that is slightly larger than the diameter of the rod 12.

The rotatable platform assembly 18 as shown in FIGS. 1, 2 and is comprised of a lower platform 20 and an upper platform 22. The two platforms are separated by a center spacer 24. All three sections preferably have a circular shape with the diameter of the two platforms being slightly less than the diameter of the stationary base 14 and the diameter of the center spacer 24 being equal to the diameter of the lower spacer 16. The lower platform 20 has a lower surface 20A, an upper surface 20B and a substantially centered rod bore 20C therethrough that is sized to rotatably fit over the rod 12. Likewise, the upper platform 22 has a lower surface 22A, an upper surface 22B and a substantially centered rod bore 22C therethrough that is sized to rotatably fit over the rod 12. The upper platform 20 as best shown in FIGS. 1, 2 and 3 also has a plurality of circular openings 22D and rectangular openings 22E that are sized to receive and hold various sizes of containers 60 and other implements. In the preferred embodiment there are four circular openings and two rectangular openings. The four circular openings have descending diameters of 1.375 inches (3.493 cm), 1.188 inches (3.016 cm), 1.125 inches (2.858 cm) and 1.0 inch (2.54 cm). The first rectangular opening has a length of 1.25 inches (3.175 cm) and a width of 0.875 inches (2.223 cm); the second rectangular has a length of 1.625 inches (4.128 cm) and a width of 0.875 inches (2.223 cm). The sizes of these openings were selected after a review of the most common container sizes available and being sold.

The center spacer 24 as shown in FIGS. 1 and 3 has a circular cross section, a lower surface 24A, an upper surface 24B and a rod bore 24C therethrough sized to rotatably fit over the rod 12. The upper surface 20B of the lower platform 20 is rigidly attached to the lower surface 24A of the center spacer and the lower surface 22A of the upper platform 22 is rigidly attached to the upper surface 24B of the center spacer 24. When so attached, both of platforms 20,22 rotate simultaneously when manually moved.

The length of the center spacer is 0.625 inches (1.588 cm) and its diameter is identical to the diameter of the lower spacer. The length of the center spacer was selected to allow the lower and upper platforms 20,22 to be sufficiently spaced apart to allow containers 60, inserted into the openings, to remain in a stable, upright position.

The final major element of the apparatus 10 is the container receiving and clamping means 30 that is disclosed in two embodiments.

The preferred embodiment of the container receiving and clamping means 30 is a single-plane-arc container receiving and clamping assembly 32. This assembly is comprised of four major elements: a rod attachment sleeve 34, a swivel arm 36, a swivel pin 37 and a container holder and clamping arms subassembly 38.

The rod attachment sleeve 34 as shown in FIGS. 1 and 3 includes a lower cavity 34A that is sized to be rigidly attached over the upper end 12B of the rod 12 by friction or if required with the addition of an adhesive. The upper end of the sleeve 34 consists of a bifurcated section 34B that has a first pin bore 34C through each side of the bifurcated section. The swivel arm 36 has an upper end 36A and a lower end tab 36B that is sized to swivelly fit into the opening of the bifurcated section 34B. The tab has a second pin bore 36C that is in alignment with the first pin bores 34C. When a swivel pin 37 is inserted through the first pin bores 34C and the second pin bore 36C, the swivel arms 36 can be moved in a single-plane-arc as shown by the arrows in FIG. 4. The container holder and clamping arms subassembly 38 is comprised of three major elements: a container holder 40, a pair of clamping arms 42 and a pair of springs 44.

The container holder 40 has a lower cavity 40A that is sized to receive and rigidly attach the upper end 36A of the swivel arm 36 as best shown in FIG. 3. On the upper end of the holder 40 is a container cavity 40B that is sized to loosely accept the bottom section of a container. The diameter of the cavity is of sufficient size that most all sizes of containers 60 can be placed into the cavity 40B as shown in FIG. 1. A thin non-slip cap may be attached to the bottom of the cavity to prevent the container from slipping.

Facing each other on opposite sides of the container cavity 40B, is a pair of clamp slots 40C as best shown in FIG. 7. Each slot has a horizontal pin bore 40D and a vertical spring cavity 40E. Into each of these clamp slots is inserted the lower section 42A of a clamping arm 42. The lower section of the arms 42 have a horizontal pin bore 42B therethrough that is in alignment with the horizontal pin bores 40D in the clamp slots 40C. Through these pin bores is inserted and attached a swivel pin 42C that holds and allows the clamping arms to move inward and outwardly substantially within the confines of the container cavity 40B. On the bottom of each lower section 42A is located a spring cavity 42D that is in substantial alignment with the respective spring cavities 40E in the container holder 40. Into each of the spring cavities 40E and 42D is inserted a spring 44. The springs provide the clamping arms 42 with an inward bias that grips a container 60 placed into the container cavity 40B. With the container gripped, a user can then swivelly position the assembly 32 in a single-plane-arc.

Figure 5:
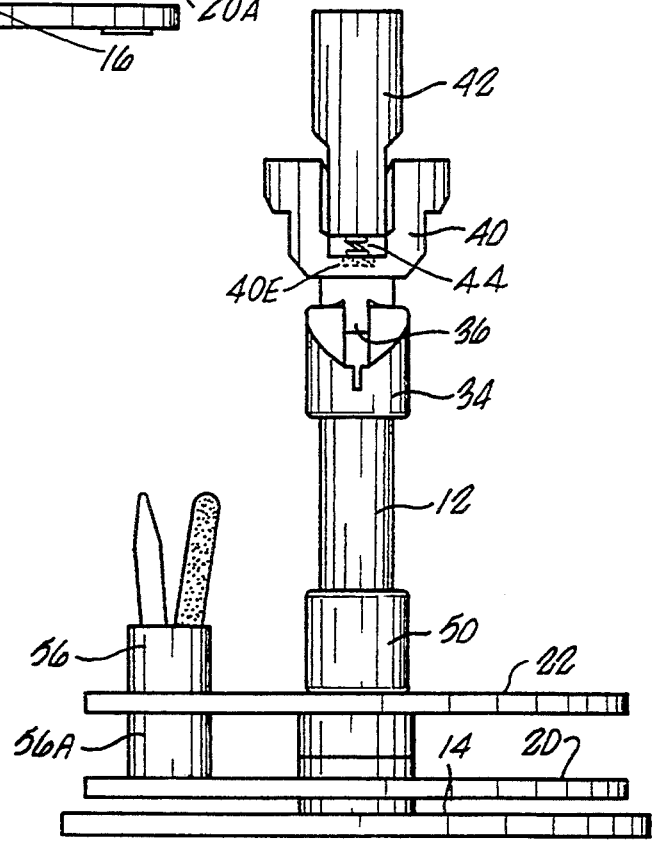
FIG. 5 is a side elevational view of the apparatus showing an elongated rectangular receptacle inserted into one of the rectangular openings.

The upper container clamping section 42E of the clamping arms 42 can be designed with vertically elongated sections 42E as shown in FIG. 5 or horizontally elongated sections 42F as shown detached in FIG. 6. Additionally, a special clamping section (not shown) can be designed to provide a gripping surface for a special object. Also, to better secure the swivel arm 36 to the container holder 40, the upper end of the swivel arm has a first fasting bore 46 and the container holder has a second fastening bore 47 in alignment with the first bore 46. Into these two bores is then inserted a screw 48 which further secures the two elements together.

The second embodiment of the container receiving and clamping means 30 consists of a multiple-plane-arc container receiving and clamping assembly 33. This assembly differs from the assembly 32 in that the assembly 33 uses a modified rod attachment sleeve 33A and a modified container holder 35.

The rod attachment sleeve 33A as shown in FIG. 7, has a lower cavity 32A that is identically sized and attached to the rod as previously described for the preferred embodiment. The upper end of the sleeve 33A differs in that it has a hemispherical cavity 33B as shown in FIG. 7. The revised upper portions of the container holder 35 are identical in form and function to the container holder 40 of the preferred embodiment. The difference in the holder 35, as also shown in FIG. 7, is that on its bottom surface projects downwardly a ball-shaped structure 35A that is sized to be inserted into and held within the hemispherical cavity 33B by an attachment means. When so attached, the assembly 33 may be rotated in all upper hemispherical directions.

Figure 4:
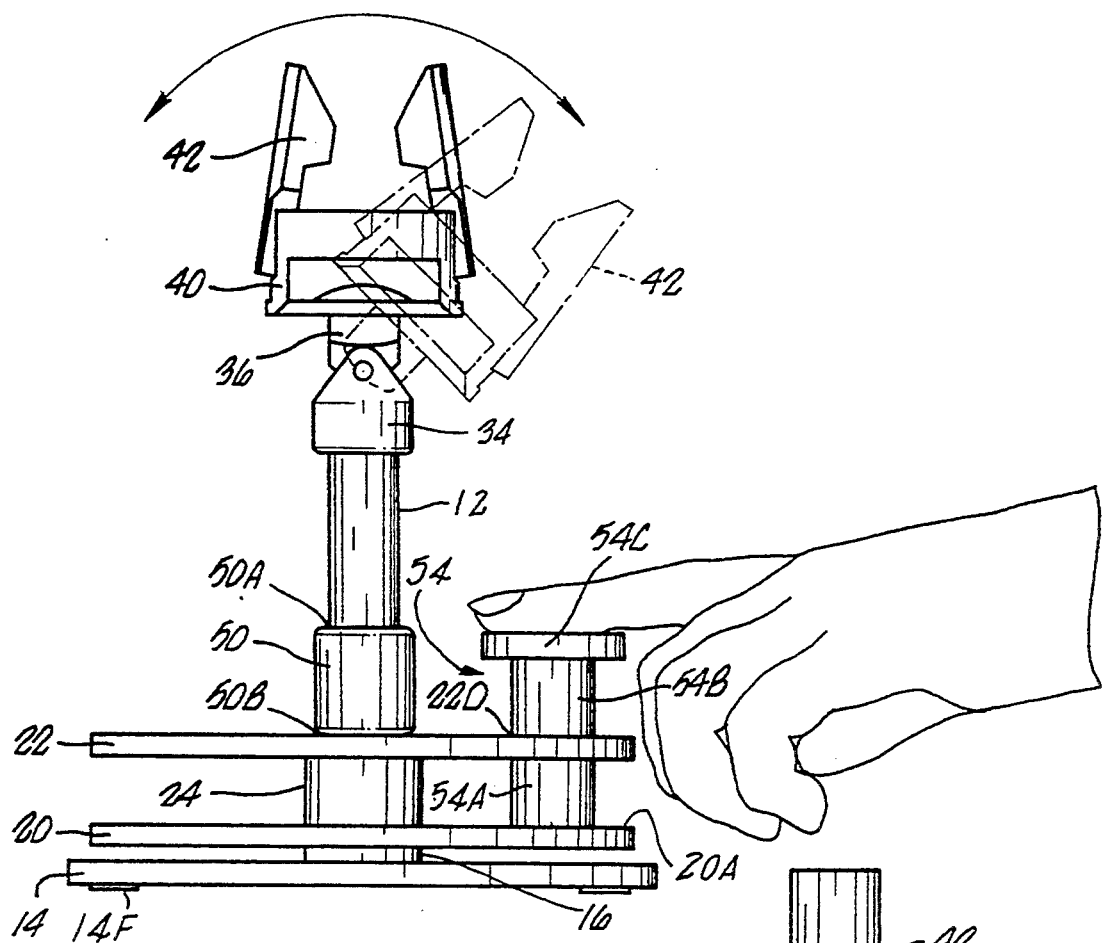
FIG. 4 is a front elevational view of the apparatus showing the rotational angle of the container holder and a finger holding stand inserted into one of the circular openings.

To allow the rotatable platform assembly 18 to remain stationary, a braking sleeve 50 is placed around the rod 12 as shown in FIGS. 1, 3 and 4. The sleeve has a rod bore 50A that is sized to allow the sleeve to frictionally move up and down. When the lower surface 50B of the sleeve is pressed against the upper surface 22B of the upper platform 22, a friction is created that causes the rotatable platform assembly 18 to remain substantially locked in place. As shown in FIG. 8, to provide a more position locking scheme, the lower surface 50B of the braking sleeve 50 can be made with a multiplicity of serrations 50C. These serrations interface with a serrated disk 52 that is placed over the rod 12 and attached to the upper surface 22B of the upper platform 22 as shown in FIG. 8. When the two serrations are interfaced, the rotatable platform assembly is locked in place.

To further enhance the utility of the invention, two external implements are designed to be used with the apparatus 10. The first is a finger holding stand 54 having a lower extension 54A further having a lower surface. The stand is sized to fit into one of the circular openings 22D of the upper platform 22 with the stand's lower surface resting on the lower surface 20 of the lower platform 20. The stand has an upper section 54B with concave depressions 54C. The depressions are sized to allow the tips of one to three fingers to be placed therein during a manicuring session as shown in FIG. 4. The second implement is an elongated rectangular structure 56 having a lower extension 56A further having a lower surface. The structure 56 is sized to fit into one of the rectangular openings 22E on the upper platform 22 with the structure's lower surface resting on the lower surface 20A of the lower platform 20 as shown in FIG. 5. The receptacle allows specially selected tools and other implements to be held therein and if desired, the entire rectangular structure 56 may be removed with the implements inside for use at a later time.

While the invention has been described in complete detail and pictorially shown in the accompanying drawings it is not to be limited to such details since many changes and modifications may be made to the invention without departing from the spirit and the scope thereof. For example, the rod 12 may be made with a threaded bore projecting upward from its lower surface 12A. This bore allows a corresponding bolt to be inserted through a stationary work surface and into the bore to allow the apparatus to be secured to the work surface. Hence, it is described to cover any and all modifications and forms which may come within the language and scope of the claims.

I claim:

1. A rotatable container-storing and selectable container-holding apparatus comprising:
   a) an upwardly extending rod having a lower surface and an upper end,
   b) a stationary base having a lower surface and an upper surface, where the upper surface is rigidly attached to the lower surface of said rod by an attachment means,
   c) a lower spacer having a lower surface, an upper surface and a rod bore therethrough sized to fit over said rod where the lower surface of said lower spacer is rigidly attached to the upper surface of said base,
   d) a rotatable platform assembly having at least a lower platform with a lower surface and an upper platform having an upper surface with said upper platform having a plurality of openings therethrough sized to receive and hold containers and other implements, where said lower and upper platforms are separated by and are rigidly attached at their lower and upper surfaces, respectively, to lower and upper surfaces of a center spacer, with said platforms and center spacer having a bore therethrough that is sized to rotatably fit over said rod with the lower surface of said lower platform rotatably placed against the upper surface of said lower spacer, and
   e) a container receiving and clamping means attached to the upper end of said rod that allows a gripped container to be swivelly positioned in a single-plane-arc.

2. The apparatus as specified in claim 1 wherein said stationary base further comprises a grouping of resilient pads attached by an adhesive to its lower surface.

3. The apparatus as specified in claim 2 wherein said base has a circular shape.

4. The apparatus as specified in claim 1 wherein the attachment means for rigidly attaching said rod to the upper surface of said base consists of having a substantially centered rod bore cut therethrough on said base that is sized to allow the lower surface of said rod to be tightly inserted therein.

5. The apparatus as specified in claim 4 further comprising an adhesive spread around said rod bore to further aid in securing said rod to said rod bore.

6. The apparatus as specified in claim 1 wherein said lower spacer has a thickness that is one-half the thickness of said stationary base.

7. The apparatus as specified in claim 1 wherein said lower and upper platforms have a circular shape with diameters that are less than the diameter of said base and both said platforms are attached so that they rotate simultaneously.

8. The apparatus as specified in claim 7 wherein said openings in said upper platform consists of circular and rectangular shapes.

9. The apparatus as specified in claim 1 wherein said center spacer has a length that allows said lower and upper platforms to be sufficiently spaced apart to allow a container inserted into said openings to remain in a stable upright position.

10. The apparatus as specified in claim 1 wherein said container receiving and clamping means comprises:
    a) a rod attachment sleeve having a lower cavity sized to be rigidly attached over the upper end of said rod, and a bifurcated upper end having a first pin bore through each of the bifurcated sections,
    b) a swivel arm having an upper end and a lower end tab sized to swivelly fit into the opening of the bifurcated section, with said tab having a second pin bore therethrough that is in alignment with the first pin bores,
    c) a swivel pin inserted through the first pin bores and the second pin bore,
    d) a container holder and clamping arms subassembly comprising:
       (1) a container holder having a lower cavity sized to receive and rigidly attach the upper end of said swivel arm,
       (2) an upper container cavity sized to loosely accept the bottom section of a container,
       (3) a pair of clamp slots facing each other on opposite sides of said container cavity, with each slot having a horizontal pin bore and a vertical spring cavity,
       (4) a pair of clamping arms with each arm having an upper container clamping section, and a lower section having a horizontal pin bore therethrough in alignment with the horizontal pin bores in said clamp slots, which into said bores is inserted a swivel pin that movably holds said clamping arms, a vertical spring cavity in substantial alignment with the respective vertical spring cavity in said container holder, and
       (5) a pair of springs where a spring is inserted into each of the respective vertical spring cavities, where said springs provide the clamping arm with an inward bias that grips a container placed in said container cavity, where said container receiving and clamping means allows a gripped container to be swivelly positioned in a single-plane-arc.

11. The apparatus as specified in claim 10 wherein said clamping area of said clamping arms are vertically elongated.

12. The apparatus as specified in claim 10 wherein said clamping area of said clamping arms are horizontally elongated.

13. The apparatus as specified in clam 10 wherein said swivel arm further having on its upper end a first fastening bore and said container holder further having a second fastening bore in alignment with the first fastening bore where into said first and second fastening bores is inserted a screw which further aids in securing said swivel section to said container holder.

14. The apparatus as specified in claim 1 wherein said container receiving and clamping means comprises:
   a) a rod attachment sleeve having a lower cavity sized to be rigidly attached over the an upper end of said rod, and on upper end having a hemispherical cavity,
   b) a container holder and clamping arms subassembly comprising:
      (1) a container holder having a bottom surface for which projects downwardly a ball-shaped structure sized to be inserted into and rotatably held within said hemispherical cavity by an attachment means,
      (2) an upper container cavity sized to loosely accept the bottom section of a container,
      (3) a pair of clamp slots facing each other on opposite sides of said container cavity, with each slot having a horizontal pin bore and a vertical spring cavity,
      (4) a pair of clamping arms with each arm having an upper container clamping section, and a lower section having a horizontal pin bore therethrough in alignment with the horizontal pin bores in said clamp slots, which into said bores is inserted a swivel pin that movably holds said clamping arms, a vertical spring cavity in substantial alignment with the respective vertical spring cavity in said container holder, and
      (5) a pair of springs where a spring is inserted into each of the respective vertical spring cavities, where said springs provide the clamping arm with an inward bias that grips a container placed in said container cavity, where said container receiving and clamping means allows a gripped container to be rotated in all upper hemispherical directions.

15. The apparatus as specified in claim 1 further comprising a braking sleeve placed around said rod where said braking sleeve has a lower surface that when pressed against the upper surface of said upper platform the pressure of the braking sleeve upon the upper platform creates a friction that causes said rotatable platform to remain substantially locked in place.

16. The apparatus as specified in claim 15 wherein the lower surface of said braking sleeve further comprises on its lower surface a multiplicity of serrations that correspond with a serrated disk placed over said rod and attached to the upper surface of said upper platform.

17. The apparatus as specified in claim 1 further comprising a finger holding stand having a lower extension with a lower surface, where said lower surface is sized to fit into one of said circular openings on said upper platform with the lower surface resting on the lower surface of said lower platform, and with said finger holding stand having an upper section having concave depressions sized to allow the tips of one to three fingers to be placed therein during a manicuring session.

18. The apparatus as specified in claim 1 further comprising a elongated rectangular receptacle having a lower extension with a lower surface, where the lower extension is sized to fit into a rectangular opening located on said upper platform with the lower surface resting on the lower surface of said lower platform, where said receptacle allows selected tools and other implements to be held therein.

19. A rotatable container-storing and selectable container-holding apparatus comprising:

A. an upwardly extending rod having a lower surface and an upper end,
B. a circular stationary base having:
   a) a lower surface having a group of resilient pads,
   b) an upper surface,
   c) a substantially centered rod bore therethrough that is sized to allow the lower surface of said rod to be tightly and rigidly inserted therein with the lower surface of said rod flush with the lower surface of said base,
C. a lower spacer having a lower surface, an upper surface and a rod bore therethrough sized to fit over said rod with the lower surface of said lower spacer rigidly attached to the upper surface of said base,
D. a rotatable platform assembly comprising:
   a) a circular lower platform having a lower surface, an upper surface and a substantially centered rod bore therethrough sized to rotatably fit over said rod,
   b) a circular upper platform having a lower surface, an upper surface and a substantially centered rod bore therethrough sized to rotatably fit over said rod and further having a plurality of circular and rectangular opening therethrough that are sized to receive and hold various sizes of containers and other implements,
   c) a center spacer having a lower surface, an upper surface and a rod bore therethrough sized to rotatably fit over said rod, where the upper surface of said lower platform is rigidly attached to the lower surface of said center spacer and the lower surface of said upper platform is rigidly attached to the upper surface of said center spacer, where when so attached, both said platforms rotate simultaneously when manually moved, where said center spacer has a length that allows said lower and upper platforms to be sufficiently spaced apart to allow a container inserted into said openings to remain in a stable, upright position,
E. a container receiving and clamping means comprising:
   a) a rod attachment sleeve having a lower cavity sized to be rigidly attached over the upper end of said rod, and a bifurcated upper end having a first pin bore through each of the bifurcated sections,
   b) a swivel arm having an upper end and a lower end tab sized to swivelly fit into the opening of the bifurcated section, with said tab having a second pin bore therethrough that is in alignment with the first pin bores,
   c) a swivel pin inserted through the first pin bores and the second pin bore,
   d) a container holder and clamping assembly comprising:
      (1) a container holder having a lower cavity sized to receive and rigidly attach the upper end of said swivel arm,
      (2) an upper container cavity sized to loosely accept the bottom section of a container,
      (3) a pair of clamp slots facing each other on opposite sides of said container cavity, with each slot having a horizontal pin bore and a vertical spring cavity,
      (4) a pair of clamping arms with each arm having an upper container clamping section, and a lower section having a horizontal pin bore therethrough in alignment with the horizontal pin bores in said clamp slots which into said bores is inserted a swivel pin that movably holds said clamping arms, a vertical spring cavity in substantial alignment with the respective vertical spring cavity in said container holder, and (5) a pair of springs where a spring is inserted into each of the respective vertical spring cavities, where said springs provide the clamping arm with an inward bias that grips a container placed in said container cavity, where said container receiving and clamping means allow a gripped container to be swivelly positioned in single-plane-arc.

* * * * *